United States Patent
Benco et al.

(10) Patent No.: US 7,941,503 B2
(45) Date of Patent: May 10, 2011

(54) SYSTEM AND METHOD FOR PROVIDING PERSONALIZED MULTIMEDIA BROADCASTING OVER A MOBILE TELECOMMUNICATIONS RADIO AREA NETWORK

(75) Inventors: David S. Benco, Winfield, IL (US); Maria Rg Azada, Naperville, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1007 days.

(21) Appl. No.: 11/585,013

(22) Filed: Oct. 23, 2006

(65) Prior Publication Data
US 2008/0098091 A1   Apr. 24, 2008

(51) Int. Cl.
| G06F 15/16 | (2006.01) |
| H04H 20/71 | (2008.01) |
| H04H 20/74 | (2008.01) |
| H04H 60/09 | (2008.01) |
| H04H 40/00 | (2008.01) |
| H04W 4/00 | (2009.01) |
| H04L 12/28 | (2006.01) |
| H04L 12/66 | (2006.01) |

(52) U.S. Cl. ........ 709/219; 709/204; 709/205; 709/206; 709/207; 709/217; 709/218; 709/227; 709/228; 709/229; 709/230; 709/231; 370/312; 370/328; 370/351; 370/352; 370/353; 370/354; 370/355; 370/356; 455/3.01; 455/3.02; 455/3.03; 455/3.04; 455/3.05; 455/3.06

(58) Field of Classification Search .......... 709/217–219, 709/227–235, 204–207; 455/3.01–3.06, 455/452.2, 454; 370/389–392, 312, 328–356
See application file for complete search history.

(56) References Cited

U.S. PATENT DOCUMENTS

| 6,760,916 | B2 * | 7/2004 | Holtz et al. ..................... 725/34 |
| 7,123,696 | B2 * | 10/2006 | Lowe ......................... 379/88.16 |
| 2002/0003783 | A1 * | 1/2002 | Niemela et al. ............... 370/329 |
| 2002/0152117 | A1 * | 10/2002 | Cristofalo et al. ............. 705/14 |
| 2003/0023757 | A1 * | 1/2003 | Ishioka et al. ............... 709/246 |
| 2003/0078986 | A1 * | 4/2003 | Ayres et al. .................. 709/217 |
| 2003/0140348 | A1 * | 7/2003 | Stewart ....................... 725/101 |
| 2003/0145064 | A1 * | 7/2003 | Hsu et al. ..................... 709/219 |
| 2004/0057420 | A1 * | 3/2004 | Curcio et al. ................. 370/352 |
| 2004/0073951 | A1 * | 4/2004 | Bae et al. ..................... 725/135 |
| 2004/0105402 | A1 * | 6/2004 | Yi et al. ....................... 370/312 |
| 2004/0111473 | A1 * | 6/2004 | Lysenko et al. .............. 709/206 |
| 2004/0114553 | A1 * | 6/2004 | Jiang et al. ................... 370/328 |
| 2004/0116125 | A1 * | 6/2004 | Terry .......................... 455/450 |
| 2004/0184432 | A1 * | 9/2004 | Gateva et al. ................ 370/349 |
| 2004/0203712 | A1 * | 10/2004 | Murai et al. ............... 455/422.1 |

(Continued)

FOREIGN PATENT DOCUMENTS

EP    1833217 A1 *  9/2007

(Continued)

*Primary Examiner* — Nathan Flynn
*Assistant Examiner* — Kai J Chang
(74) *Attorney, Agent, or Firm* — Fay Sharpe LLP (57) ABSTRACT

A system and method of providing personalized broadcast transmissions Broadcasting-Party-Designated Recipients over a mobile telecommunications Radio Area Network is provided. The Broadcasting Party can send multimedia content for a personalized broadcast to an IMS Application Server in a SIP Message and broadcast the multimedia content to the mobile telecommunications terminals of the Broadcasting-Party-Designated Recipients. The personalized broadcast transmission can be generating using a plurality of unicast transmissions or a multicast transmission made to a multicast channel/address.

15 Claims, 6 Drawing Sheets

U.S. PATENT DOCUMENTS

| | | | |
|---|---|---|---|
| 2005/0043035 A1* | 2/2005 | Diesen et al. | 455/454 |
| 2005/0190740 A1* | 9/2005 | Zhao et al. | 370/349 |
| 2006/0089999 A1* | 4/2006 | Xiang et al. | 709/229 |
| 2006/0288091 A1* | 12/2006 | Oh et al. | 709/219 |
| 2007/0050510 A1* | 3/2007 | Jiang | 709/227 |
| 2007/0055783 A1* | 3/2007 | Gourraud | 709/227 |
| 2007/0070962 A1* | 3/2007 | Kilburn et al. | 370/338 |
| 2007/0097879 A1* | 5/2007 | Bleckert et al. | 370/254 |
| 2007/0100648 A1* | 5/2007 | Borquez et al. | 705/1 |
| 2007/0160072 A1* | 7/2007 | Thalanany et al. | 370/401 |
| 2007/0211665 A1* | 9/2007 | Yoshida et al. | 370/331 |
| 2008/0092239 A1* | 4/2008 | Sitrick et al. | 726/27 |

FOREIGN PATENT DOCUMENTS

WO    WO 2005081569 A1 *   9/2005

* cited by examiner

SYSTEM AND METHOD FOR PROVIDING PERSONALIZED MULTIMEDIA BROADCASTING OVER A MOBILE TELECOMMUNICATIONS RADIO AREA NETWORK

BACKGROUND OF THE INVENTION

This invention relates to a mobile telecommunications, also known as wireless or cellular telecommunications, and more particularly to a system and method for providing personalized multimedia broadcasting/multicasting to mobile subscribers. While the invention is particularly directed to the art of mobile telecommunications networks, and will be thus described with specific reference thereto, it will be appreciated that the invention may have usefulness in other fields and applications.

Mobile telecommunications Service Providers, are deploying high-speed data capability in their telecommunications networks suitable for transmitting multimedia. However many of the anticipated applications are slow to be realized.

One factor inhibiting these applications is that most data-centric wireless applications require a dedicated packet data session to be established between the mobile handset and the data source. For a data-throughput rate of 100 kbps (for minimal video bandwidth), a fully equipped 1xEV-DO cell can support only 20-50 simultaneous users, depending upon RF conditions. However, this is far fewer than the number of subscribers a typical cell supports, since such cells can cover areas measured in square miles.

Other technologies for allowing mobile handsets to receive multimedia content exist, such as those utilizing out-of-band (for the cellular network) transmissions which do not reduce the available wireless bandwidth. However, these technologies suffer from lack of geographic granularity and diversity, since the same program content is broadcast to an entire metropolitan area. As such, these systems are costly to use, limiting their use to advertising, satellite radio, television reruns, etc.

Consequently, most existing mobile telecommunications services utilize the "pull" paradigm, where mobile subscribers have to seek out, and pay for, the multimedia content they receive. This scenario represents an additional barrier to ease of use and willingness to adopt such services.

Wireless subscribers, and consumers in general, have demonstrated their preference to personalize and customize the services they receive. For example, the growth of satellite radio and cable television attest to the fact that consumers no longer subscribe to a pre-established rather uniform model of broadcast television or traditional radio. In addition, consumers generally seek relief from advertising, as evidenced by the success of commercial-free satellite radio, limited commercial television, recording devices that can fast-forward through commercials, watching a TV series on DVD a year late rather than live, etc.

The present invention contemplates a new and improved system and method that resolves the above-referenced difficulties and others.

SUMMARY OF THE INVENTION

A system and method for providing personalized broadcasting of multimedia over a Radio Area Network is provided.

In one aspect of the invention the method includes receiving multimedia content provided by the Broadcasting Party at an IMS Application Server, receiving Broadcasting-Party-Designated Recipient identifiers at the IMS Application Server identifying the Recipients designated by the Broadcasting Party for receiving the broadcast transmission, receiving broadcast parameters from the Broadcasting Party at the IMS Application Server, the broadcast parameters indicating the broadcast transmission is to be at least one of a scheduled broadcast and an immediate broadcast, and generating an inband broadcast transmission to the mobile telecommunications terminals corresponding to the Broadcasting-Party-Designated Recipients via the Radio Area Network.

In another aspect of the invention, the system includes means for receiving multimedia content provided by the Broadcasting Party at an IMS Application Server, means for receiving Broadcasting-Party-Designated Recipient identifiers at the IMS Application Server identifying the Recipients designated by the Broadcasting Party for receiving the broadcast transmission, means for receiving broadcast parameters from the Broadcasting Party at the IMS Application Server, the broadcast parameters indicating the broadcast transmission is to be at least one of a scheduled broadcast and an immediate broadcast, and means for generating an inband broadcast transmission to the mobile telecommunications terminals corresponding to the Broadcasting-Party-Designated Recipients via the Radio Area Network.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION

Figure 1:
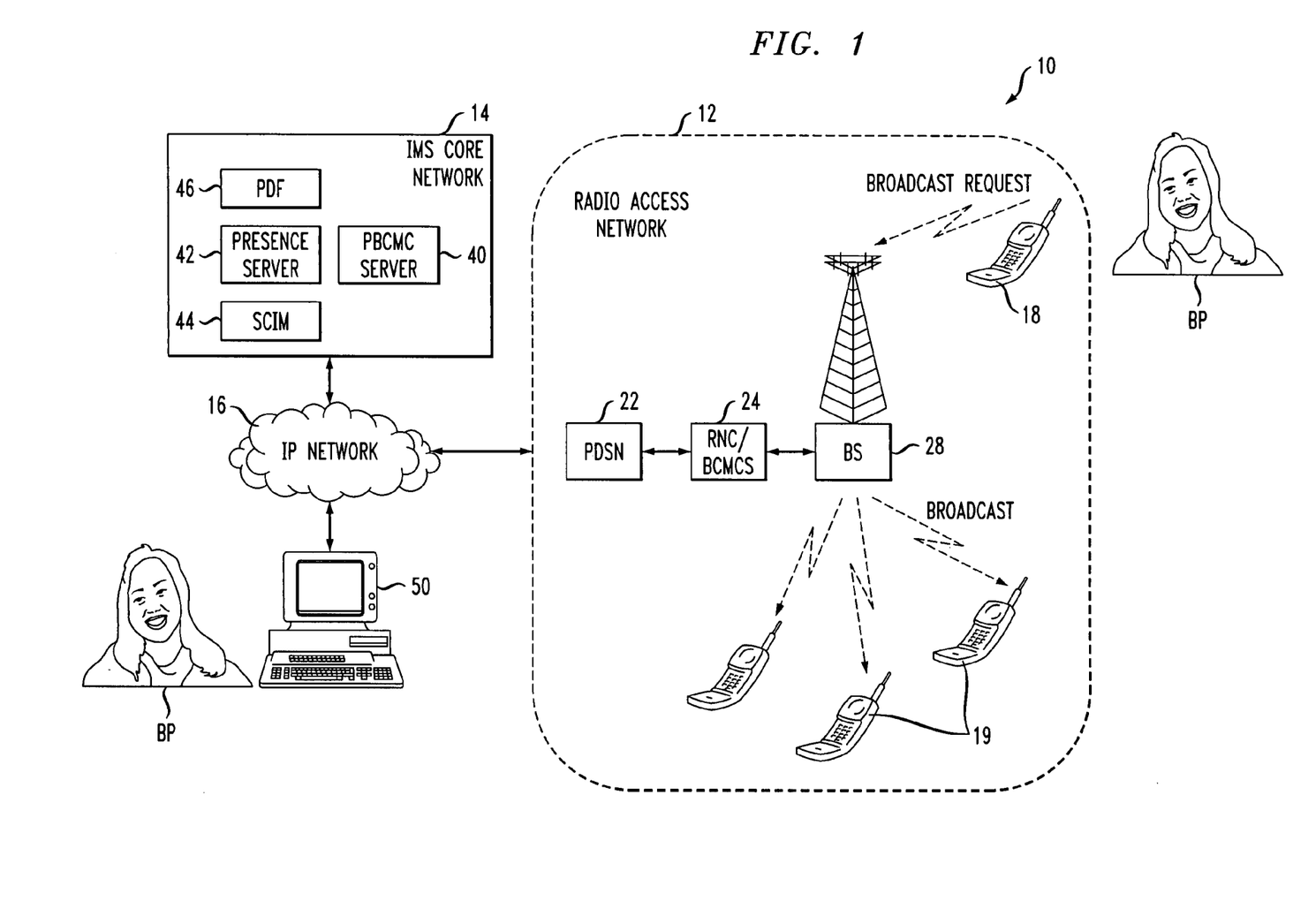
FIG. 1 a block diagram illustrating a system in accordance with the invention.

Referring now to the drawings wherein the showings are for purposes of illustrating the exemplary embodiments only and not for purposes of limiting the claimed subject matter, FIG. 1 provides a view of a system into which the presently described embodiments may be incorporated.

FIG. 1 includes a mobile telecommunications Radio Access Network (RAN) 12 connected to an IMS Core Network 14 via an IP network 16 providing a system, shown generally at 10, for providing Personalized Broadcast/Multicast Services (Personalized BCMCS). A Broadcasting Party (BP) can utilize the system 10 to tailor a Personalized Broadcast/Multicast of multimedia content to a BP-designated group of mobile users, also referred to herein as BP-designated recipients, via their mobile terminals 19, also known as cellular phones, or wireless handsets, or User Equipment.

A CDMA 2000 RAN 12 is shown for the purposes of illustrating an example embodiment, though it should be appreciated that other RANs, including GSM networks and WiFi networks, having suitable elements/nodes performing similar functions as described herein can also be used.

The RAN 12 includes a Packet Data Serving Node (PDSN) 22 acting as the connection point between the RAN 12 and the IP network 16. The PDSN 22 is responsible for managing Point-to-Point sessions between the mobile terminals 19 and the Service Provider's core IP network for providing the terminals with multimedia communications with the IMS network 14.

The RAN 12 also includes a Radio Network Controller (RNC) 24 connected to the PDSN 22 and one or more Base Stations (BS) 28, also known as Base Transceiver Stations (BST), providing mobile multimedia telecommunications to the mobile terminals 19 over an air interface. The RNC 24 carries out radio resource management, mobility management functions and encryption functions for the mobile terminals. The RNC 24 and BS 28 are Evolution-Data Optimized rev. A (EV-DOrA), also known as a Data-Optimized (DO), nodes capable of providing BCMC services including inband BCMC transmissions made to a multicast address/channel capable of being received by the mobile terminals 19.

The RAN 12 is connected to an Internet Protocol Multi-Media Subsystem (IMS) network 14. The IMS network 14 is an IP multimedia and telephony core network defined by 3GPP and 3GPP2 standards and organizations based on IETF Internet protocols, supporting IP to IP session over wireline IP, 802.11, 802.15, CDMA, packet data along with GSM/EDGE/UMTS and other packet data applications enabling convergence voice and data services for mobile telecommunications subscribers when combined with the RAN 12. The IMS network 14 consists of session control, connection control and applications services including subscriber services such as the Personalized BCMC Services described herein.

The IMS network 14 includes a Personalized BCMCS IMS Application Server 40, also referred to herein as the Application Server (AS). The AS 40 is a computing node having functional capabilities for providing the PBCMC services, including coordinating and collecting broadcast requests initiated by the BP, filtering these requests based on BP-designated mobile recipient lists and the availability of these recipients, as well as sending the broadcast/multicast transmissions to the recipients via the RAN 12 as described in further detail below.

The IMS network 14 also includes a Presence Server 42 connected to the AS 40 for providing information as to the availability of mobile terminals 19 as determined by the registration of such terminals with the RAN 12. A Service Capabilities Interaction Manager (SCIM) 44 is provided for acting as a broker or interface between the AS 40 and the Presence Server 42 as described in further detail below. A Policy Decision Function (PDF) 46 implements policy decisions relating to the Broadcast transmission which may be defined by the Service Provider or recipients as described in further detail below.

A mobile subscriber (BP) can initiate a Broadcast/Multicast (BCMC) of multimedia content, including but not limited to audio, video, text, etc., to a group of Subscribers 19 over a RAN 12. The PBCMC Service can be made available to Subscribers by the telecommunications Service Provider as a subscription based service if so desired. The Personalized BCMC Service can be tailored to each individual BP requesting such a transmission enabling that user to define the mobile users capable of receiving it as well as other parameters as shall be described in further detail below.

Figure 2:
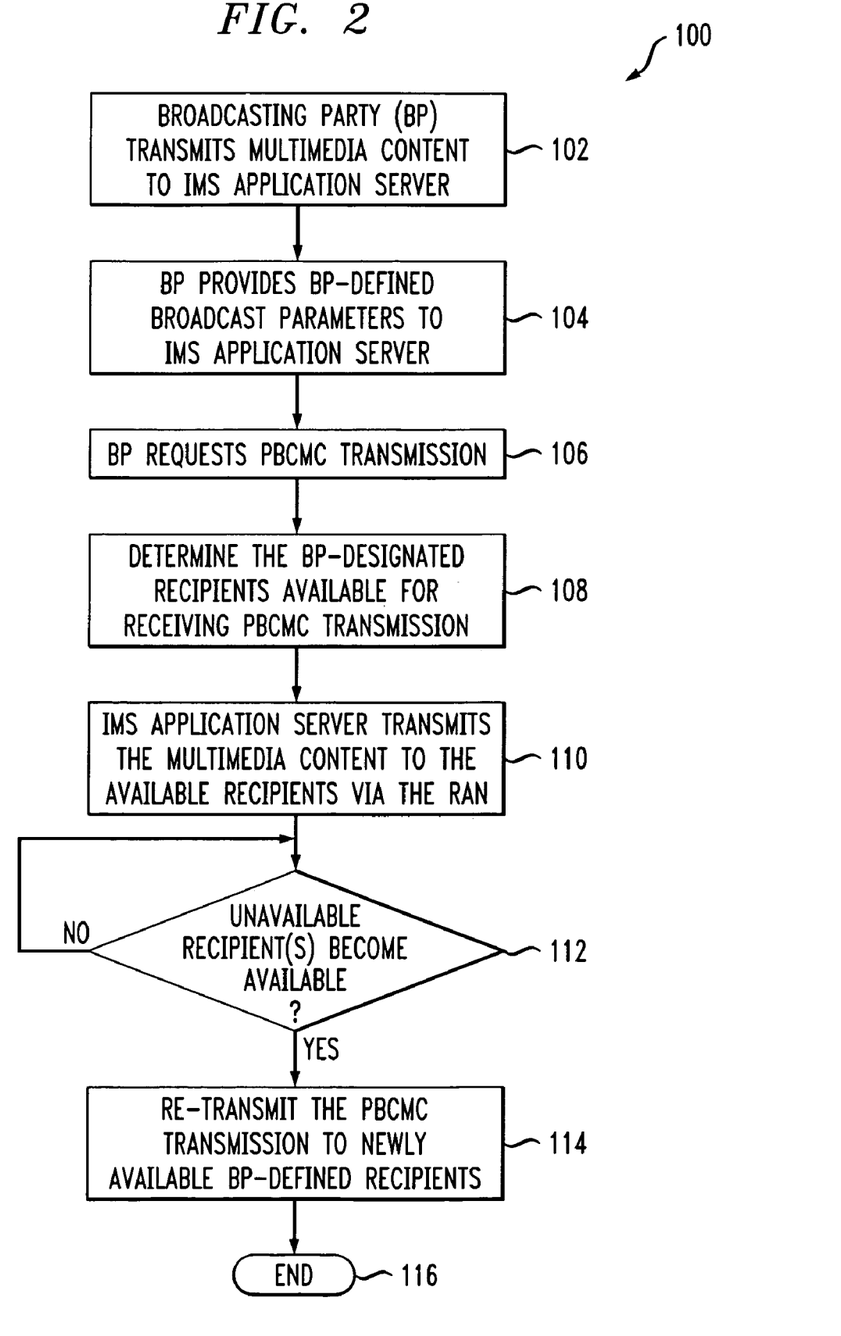
FIG. 2 is a flow chart illustrating steps of the invention.

Referring now to FIG. 2 a method for providing Personalized BCMCS to an individual mobile Subscriber, referred to herein as the Broadcasting Party (BP), is shown generally at 100.

The BP transmits the multimedia content to the IMS Application Server 40 at 102 for a future personalized broadcast. The multimedia content can include audio clips, video clips, and text messages, among others.

In one example, which should not be considered limiting, the BP uploads the multimedia content using an MP3-compatible handset 18 connected to the IMS Application Server 40 via the RAN 12. In another example, the multimedia content can be provided to the IMS Application Server 40 by the BP using a computer 50 connected thereto via an HTTP interface or other IP-based network connection.

The BP provides BP-designated broadcast parameters to the IMS Application Server for the associated broadcast at 104. The BP-defined broadcast parameters can include, but are not limited to, an identification of the mobile recipients the BP wants to receive the broadcast, also referred to herein as BP-designated recipients (BPDR) or intended recipients. The BP-designated recipients can be identified using one or more BPDR identifiers identifying the intended mobile recipients' mobile terminals, such as for example by phone number, SIP URI, IP address, or in other known manners.

The BP-designated broadcast parameters can also include, the type of broadcast requested, including a manually initiated broadcast initiated by the BP by sending the broadcast request, or a scheduled broadcast occurring at a day and time also provided by the BP. The BP-designated broadcast parameters can also indicate that the broadcast is a recurring broadcast as described in further detail below, or a single one-time broadcast.

Figure 3:
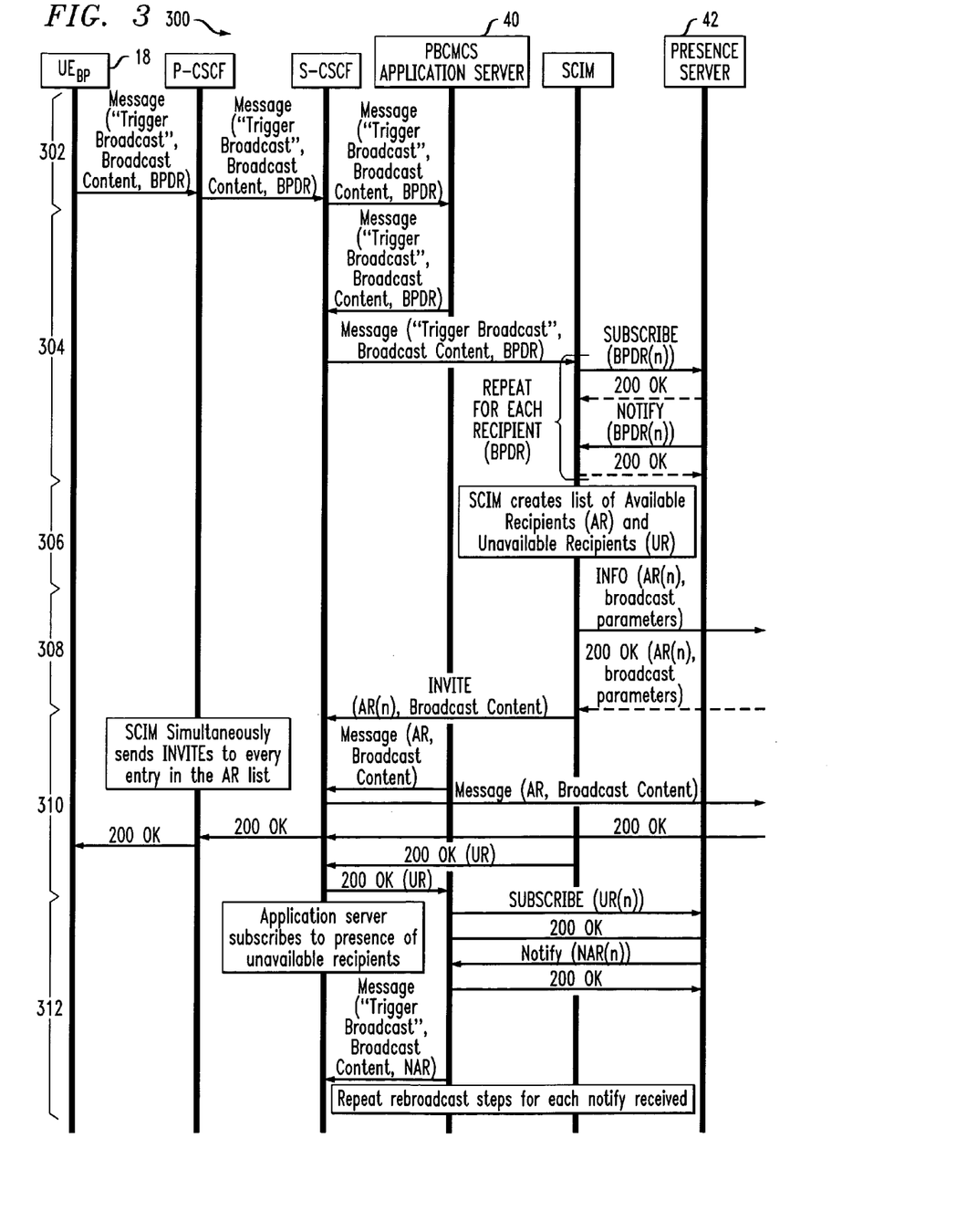
FIG. 3 is a call flow diagram illustrating the transfer of SIP messages in accordance with the invention.

The BP requests the PBCMC transmission at 106. The BP can transmit the request to the IMS Application Server via the computer connected thereto or via the BP's UE 18. Referring now to FIG. 3, a call flow diagram is shown generally at 300 illustrating an example of providing the personalized broadcast using the BP's UE 18. In this example, the BP wants to send a single broadcast to a group of recipients (via their UEs 19) that the BP has defined.

The personalized broadcast request is sent from the BP UE 18 to the PBCMC Application Server 40 in one or more SIP Message Methods. The SIP message includes a Broadcast Trigger for triggering the Personalized Broadcast based on the type of broadcast as described above. In this example, the SIP message Broadcast Trigger indicates that the broadcast is to be a one-time broadcast manually triggered by the SIP broadcast request message the BP is sending.

The SIP message can also include the broadcast content including the audio/video media to be broadcast, and at least some of the BP-designated broadcast parameters including the BPDR identifiers described above. In the example provided herein, the BP mobile terminal 18 transmits the SIP message to a proxy Call State Control Function (P-CSCF) which sends it to the Serving Call State Control Function (S-CSCF) which sends it to the IMS Application Server as shown at 302.

Referring now to FIGS. 2 and 3, the BP-designated recipients available for receiving the PBCMC transmission, also referred to as available recipients, are determined at 108. The available recipients are determined by determining the mobile terminals associated with the BP-designated recipients that are currently registered with the network. To determine this, the IMS Application Server 40 queries the Presence Server 42 at 304. The query is sent to the Presence Server 42 via the SCIM 44. A separate query and response session can be created between the SCIM 44 and the Presence Server 42 for each recipient identified above for determining recipient availability, or the availability of the plurality of recipients can be determined using a single session if so desired.

In this example, which should not be considered limiting, the SCIM 44 builds a list of available recipients (AR) and unavailable recipients (UR) by querying the Presence Server 42 as to the availability of the UEs identified from the BPDR list. The Presence Server 42 notifies the SCIM 44 as to the availability/unavailability of each recipient enabling the SCIM to generate the AR list and the UR list at 306.

The SCIM 44 can also validate at 308 additional, optional recipient-defined and/or Service Provider-defined Policies in relation to the Broadcast parameters provided above. The SCIM 44 queries the PDF 46 at 308 providing the broadcast parameters and identification of the available recipients. The PDF 46 determines if the broadcast parameters conflict with previously provided Service Provider Policies or recipient provided Policies and notifies the SCIM 44 of any conflicts. The SCIM 44 can prevent the broadcast from being made to one or more of the recipients in such cases if so desired, such as for example by excluding them from the AR list. Examples of such policies can include, but are not limited to, blackout times/dates for broadcasts based on days/times provided by individual recipients as well as the Service Provider.

The Personalized Broadcast Transmission is then sent to the available recipient mobile terminals 19 at 110 via the RAN 12. In the example provided herein, Broadcast Transmission is accomplished using a plurality of unicast transmissions made by the AS/SCIM in the form of SIP Invites sent to every available recipient mobile terminal at shown at 310.

The availability of previously unavailable BP-designated recipients, those listed in the UR list described above, can be tracked at 114. When previously unavailable recipient terminals 19 become available, the Personalized Broadcast Transmission can be resent to them at 116. Referring to FIG. 3, Application Server can query the Presence Server as shown at 312 to determine when a previously unavailable recipient becomes available as a Newly Available Recipient (NAR). The Broadcast Transmission is then made to the list of NAR recipients in a manner similar to that described above.

Figure 4:
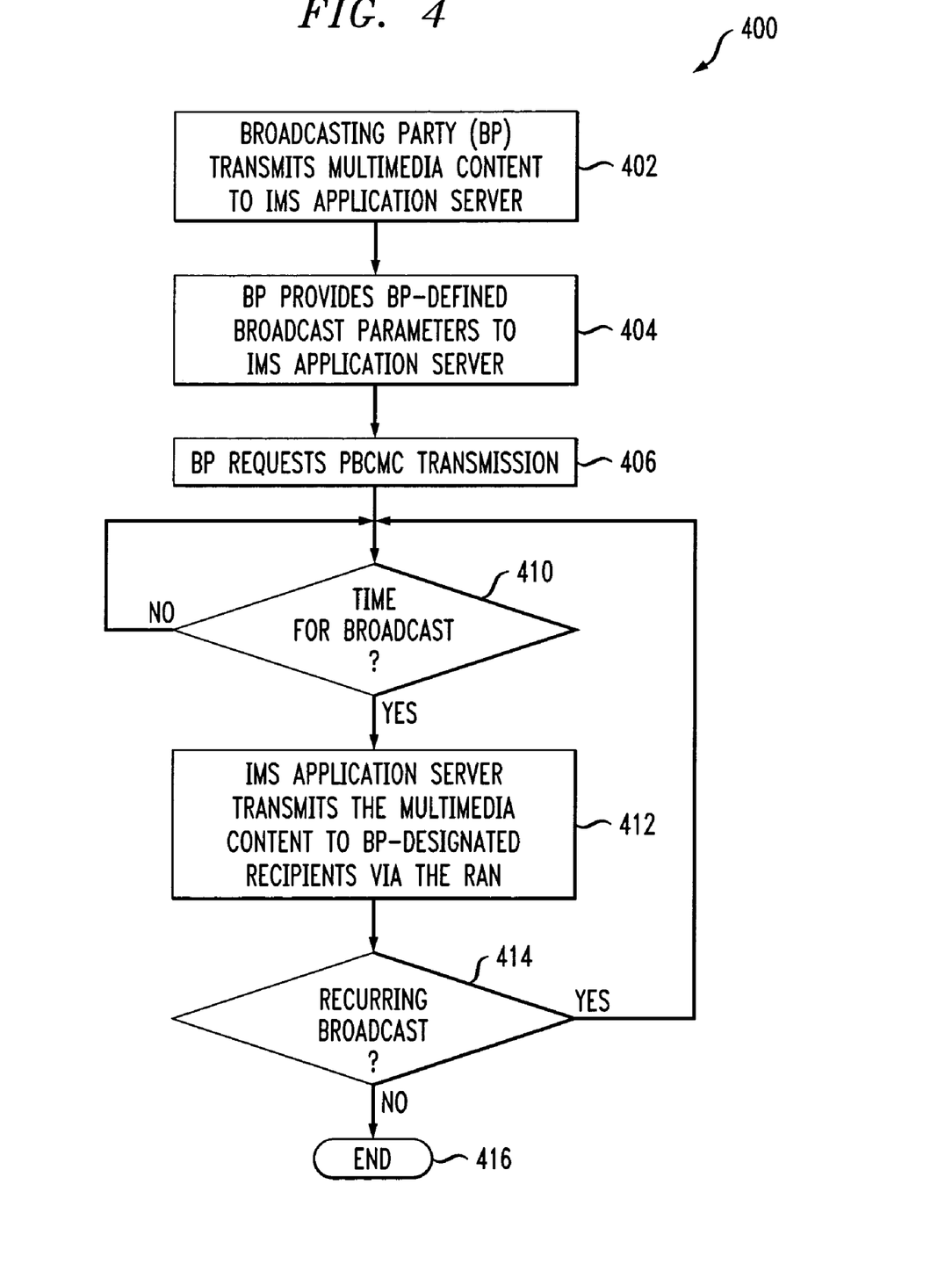
FIG. 4 is a flow chart illustrating steps of another embodiment of the invention.
Figure 5:
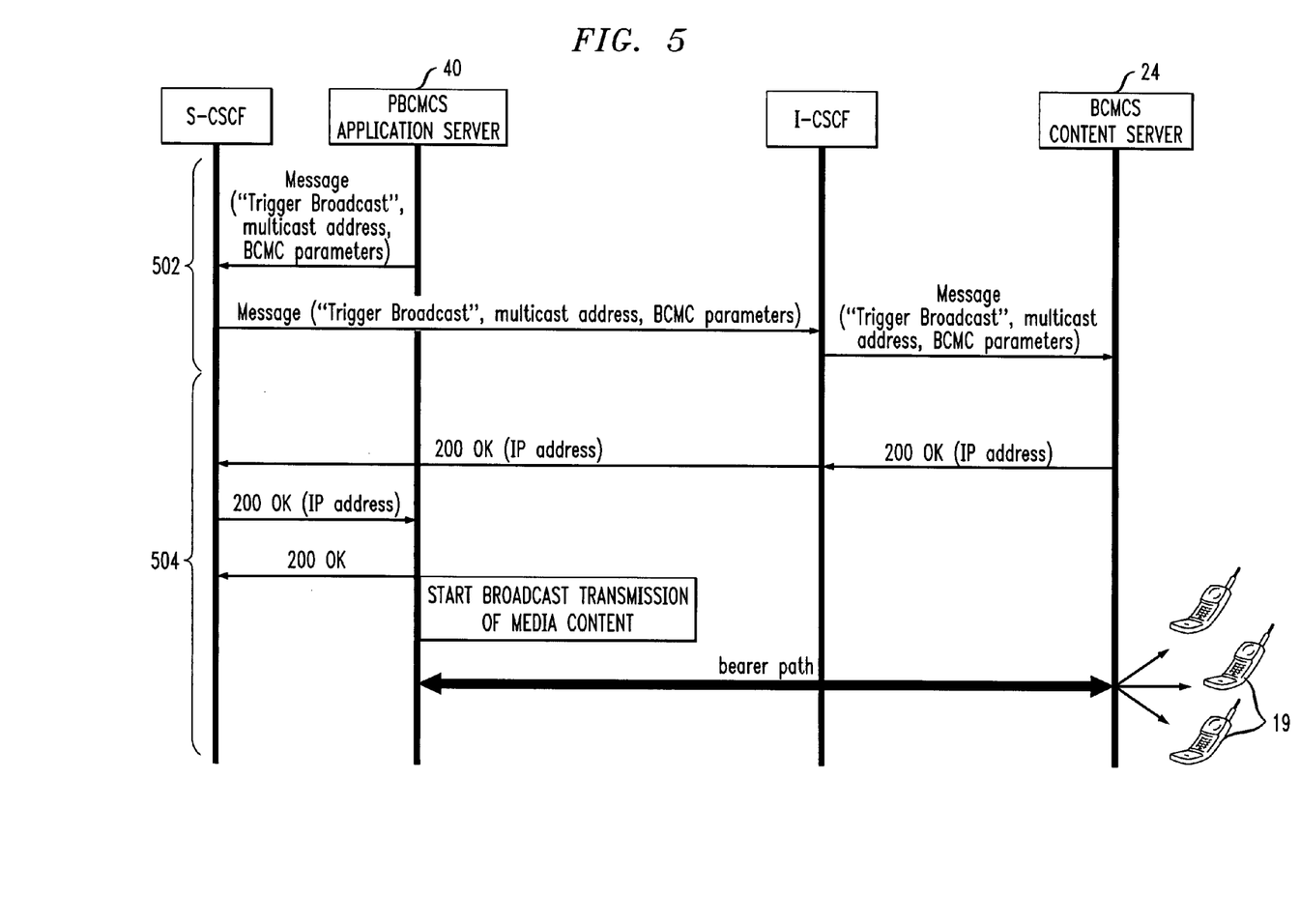
FIG. 5 is a call flow diagram illustrating the transfer of SIP messages in accordance with the invention.

Referring now to FIGS. 4 and 5 another method for providing Personalized BCMCS to a BP is shown generally at 400. This method includes using known BCMC services of a DOrevA RAN network.

The BP transmits the multimedia content to the Application Server at 402 in a manner similar to that described in step 202 above.

The BP also provides BP-defined broadcast parameters to the Application Server at 404 in a manner similar to that described in step 204 above. The broadcast parameters in this example include, but are not limited to, the Broadcast Trigger indicating that the broadcast is to be a scheduled multicast made using a known DO BCMCS Broadcast Server. Other broadcast parameters sent via the Broadcast Request message include the day and time the broadcast is to begin, one or more alternate days and times that the recurring broadcast will be re-broadcast, and any retry options as desired.

The BP requests the Personalized Broadcast Transmission at 406 by sending the Broadcast Request to the Application Server 42. This can be accomplished using SIP messaging sent from the BP UE 18 to the Application Server, or by a request made via a computer connected to the Application Server, among others.

The Application Server 42 waits for the broadcast time as shown at 410. At the time of the broadcast, the Application Server 42 sends a Broadcast Message in the form of a SIP Message Method to a BCMCS Content Server 24. More specifically, as shown in FIG. 5, the Application Server sends the SIP Broadcast Message to the Serving Call State Control Function as shown at 502. The SIP message includes a Trigger Broadcast command, the broadcast content, and the BCMCS multicast address corresponding to the BCMCS channel to which the broadcast is to be made and other suitable broadcast parameters described above. The SCSCF sends the SIP message to an Interrogating CSCF which sends it to the BCMCS Content Server as shown at 502.

The Application Server can be the repository for the broadcast content as provided by the BP via the BP UE 18 or via the IP networked connected computer 50. In such cases, a Bearer Channel is established between the Application Server 40 and the BCMCS Content Server as shown at 504. The BCMCS Content Server then broadcasts the content as shown as step 412 provided by the Application Server to the multicast channel in a known manner so that it can be received by the recipient terminals.

The Application Server also determines at 414 if the broadcast is to be a recurring broadcast as indicated by the BP in the broadcast parameters described above. If so, the broadcast is re-broadcast in a similar manner as described.

The Personalized BCMC Service provides a solution to sending/receiving multimedia content where individual Broadcasting Parties can utilize the broadcast/multicast capabilities of the mobile Radio Area Network to broadcast their multimedia content to the people they choose. The service utilizes a "push" model, where the content supplier (the Broadcasting Party) pays for the cost of delivering the service, and no special action is required by the recipients to receive the service.

The Personalized BCMC Service uses only slightly more RAN resources than those used for an individual packet data session at the same cell, and thus its use is not restricted to high-cost pre-programmed multimedia content from a small group of content providers such as satellite radio, etc., but rather can be utilized by individual mobile telecommunications subscribers.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method of providing personalized broadcast transmissions requested by a mobile telecommunications subscriber having a mobile terminal to Designated Recipients over a mobile telecommunications Radio Area Network comprising:

receiving multimedia content provided by the mobile telecommunications subscriber at an Internet Protocol Multi-Media Subsystem (IMS) Application Server;

receiving Designated Recipient identifiers at the IMS Application Server from the mobile telecommunications subscriber identifying the Designated Recipients designated by the mobile telecommunications subscriber for receiving the personalized broadcast transmission;

receiving broadcast parameters from the mobile telecommunications subscriber at the IMS Application Server, the broadcast parameters indicating the personalized broadcast transmission is to be at least one of a scheduled broadcast and an immediate broadcast;

receiving a personalized broadcast request at the IMS Application Server sent from the mobile terminal of the mobile telecommunications subscriber requesting an inband broadcast transmission to the Designated Recipients; and generating the inband broadcast transmission to mobile telecommunications terminals corresponding to the Designated Recipients via the mobile telecommunications Radio Area Network;

wherein the received personalized broadcast request is a single SIP message, containing the broadcast parameters, the multimedia content, a broadcast trigger triggering the generation of the inband broadcast transmission and the Designated Recipient identifiers received from the mobile terminal of the telecommunications subscriber connected to the IMS Application Server via the mobile telecommunications Radio Area Network.

2. The method defined in claim 1 wherein the step of receiving the multimedia content at the IMS Application Server includes receiving the multimedia content from the mobile telecommunications subscriber via a computer connected to the IMS Application Server by an IP connection.

3. The method defined in claim 1 wherein the step of receiving the multimedia content at the IMS Application Server includes receiving the multimedia content from the mobile telecommunications subscriber in a SIP message sent from the mobile terminal connected to the IMS Application Server via the mobile telecommunications Radio Area Network.

4. The method defined in claim 1 wherein the broadcast parameters indicate the personalized broadcast transmission to be the scheduled broadcast, the method further comprising:
receiving a scheduled start day and time when the scheduled transmission is to begin transmission, wherein the step of generating the inband broadcast transmission includes generating the inband broadcast transmission at the scheduled start day and time.

5. The method defined in claim 1 wherein the step of generating the inband broadcast transmission to the mobile telecommunications terminals includes broadcasting the multimedia content to the mobile telecommunications terminals on a multicast channel via a Broadcast/Multicast Service provided by an Evolution-Data Optimized compatible Radio Network Controller.

6. A system for providing personalized broadcast transmissions requested by a mobile telecommunications subscriber to Designated Recipients over a mobile telecommunications Radio Area Network comprising:
means for receiving multimedia content provided by the mobile telecommunications subscriber at an Internet Protocol Multi-Media Subsystem (IMS) Application Server;
means for receiving Designated Recipient identifiers at the IMS Application Server from the mobile telecommunications subscriber identifying the Designated Recipients designated by the mobile telecommunications subscriber for receiving the personalized broadcast transmission;
means for receiving broadcast parameters from the mobile telecommunications subscriber at the IMS Application Server, the broadcast parameters indicating the personalized broadcast transmission is to be at least one of a scheduled broadcast and an immediate broadcast;
means for receiving a broadcast request at the IMS Application Server sent from the mobile terminal of the mobile telecommunications subscriber requesting an inband broadcast transmission to the Designated Recipients;

means for generating the inband broadcast transmission to mobile telecommunications terminals corresponding to the Designated Recipients via the mobile telecommunications Radio Area Network; and means for determining the mobile telecommunications terminals corresponding to the Designated Recipient available for receiving the personalized broadcast transmission, wherein the means for generating the inband broadcast transmission includes means for generating separate unicast transmissions to each of the available mobile terminals over the mobile telecommunications Radio Area Network;

wherein the means for generating the separate unicast transmissions includes means for sending separate SIP Invite Requests to each available mobile telecommunications terminal corresponding to the Designated Recipients.

7. The system defined in claim 6 wherein the means for receiving the multimedia content at the IMS Application Server includes means for receiving the multimedia content from the mobile telecommunications subscriber via a computer connected to the IMS Application Server by an IP connection.

8. The system defined in claim 6 wherein the means for receiving the multimedia content at the IMS Application Server includes means for receiving the multimedia content from the mobile telecommunications subscriber in a SIP message sent from the mobile terminal via the mobile telecommunications Radio Area Network.

9. The system defined in claim 6 wherein the broadcast parameters indicate the personalized broadcast transmission to be the scheduled broadcast, the system further comprising:
means for receiving a scheduled start day and time when the scheduled transmission is to begin transmission, wherein the means for generating the inband broadcast transmission includes means for generating the inband broadcast transmission at the scheduled start day and time.

10. The system defined in claim 6 wherein the means for generating the inband broadcast transmission to the mobile telecommunications terminals includes means for broadcasting the multimedia content to the mobile telecommunications terminals on a multicast channel via a Broadcast/Multicast Service provided by an Evolution-Data Optimized compatible Radio Network Controller.

11. A method of providing personalized broadcast transmissions requested by a mobile telecommunications subscriber having mobile terminal Designated Recipients over a mobile telecommunications Radio Area Network comprising:
receiving multimedia content provided by the mobile telecommunications subscriber at an Internet Protocol Multi-Media Subsystem (IMS) Application Server;
receiving Designated Recipient identifiers at the IMS Application Server from the mobile telecommunications subscriber identifying the Designated Recipients designated by the mobile telecommunications subscriber for receiving the personalized broadcast transmission;
receiving broadcast parameters from the mobile telecommunications subscriber at the IMS Application Server, the broadcast parameters indicating the personalized broadcast transmission is to be at least one of a scheduled broadcast and an immediate broadcast;

receiving a personalized broadcast request at the IMS Application Server sent from the mobile terminal of the mobile telecommunications subscriber requesting an inband broadcast transmission to the Designated Recipients; and generating the inband broadcast transmission to mobile telecommunications terminals corresponding to the Designated Recipients via the mobile telecommunications Radio Area Network;

the IMS Application Server querying a Presence Server via a Service Capabilities Interaction Manager (SCIM) for determining the mobile telecommunications terminals associated with the Designated Recipients that are registered with the mobile telecommunications Radio Area Network; and the SCIM building a list of available mobile telecommunications terminals corresponding to the Designated Recipients and unavailable Designated Recipients' mobile telecommunications terminals by querying the Presence Server as to an availability of the mobile telecommunications terminals identified by the Designated Recipient identifiers separately for each Designated Recipient;

wherein the received personalized broadcast request is one or more SIP messages received from the mobile telecommunications subscriber's mobile terminal connected to the IMS Application Server via the mobile telecommunications Radio Area Network; and wherein the broadcast parameter indicates the personalized broadcast transmission is to be the immediate broadcast and the received personalized broadcast request is a SIP message including a broadcast trigger triggering the generation of the inband broadcast transmission.

12. The method defined in claim 11 further comprising creating a single query and response session between the SCIM and the Presence Server for all Designated Recipients.

13. The method defined in claim 11 further comprising:
the SCIM validating additional Designated Recipient-defined or Service Provider-defined Policies in relation to the broadcast parameters by querying a Policy Decision Function node;
Policy Decision Function node determining if the broadcast parameters conflict with previously provided policies and notifying the SCIM of conflicts; and
the SCIM preventing the personalized broadcast transmission from being made to one or more of the designated recipients.

14. The method defined in claim 11 further comprising:
tracking the availability of previously unavailable mobile telecommunications terminals corresponding to the Designated Recipients;
determining when at least one previously unavailable mobile telecommunications terminal corresponding to the Designated Recipients becomes available for receiving the personalized broadcast transmission; and
resending the personalized broadcast transmission to the at lest one available mobile telecommunications terminal corresponding to the Designated Recipients.

15. The method defined in claim 11 wherein the IMS Application Server is a repository for the multimedia content and further comprising establishing a Bearer Channel between the IMS Application Server and a Broadcast/Multicast Service for transmitting the multimedia content thereto for broadcasting.

* * * * *